121,853

UNITED STATES PATENT OFFICE.

JOSEPH CUSHMAN, OF THOMSON, ILLINOIS.

IMPROVEMENT IN WINDMILLS.

Specification forming part of Letters Patent No. 121,853, dated December 12, 1871.

*To all whom it may concern:*

Be it known that I, JOSEPH CUSHMAN, of Thomson, county of Carroll and State of Illinois, have invented an Improvement in Windmills; and I do hereby declare the following to be a full, clear, and exact description of the same, reference being had to the accompanying drawing making a part of this specification.

The invention relates to that class of windmills in which the fans or sails, and their incidents, are built upon a horizontal frame which is provided with a rudder-wheel, and arranged to turn upon a table. The fans are designed to turn in a perpendicular position, and are attached to one end of a hollow shaft through which a rod passes, the rod being connected with the rudder-wheel and so arranged as to keep the sails in the most advantageous position. The object of the invention is to provide a windmill in which the force of the wind alone will at all times cause the fans to stand in the most advantageous position.

Figure 1 is a perspective side view of a machine embodying the elements of the invention. Fig. 2 is a vertical transverse section through the wheel $h$ and adjacent parts.

A is a frame constructed of two timbers or bars, $a\ a'$, which are braced together, an interval being left between them, as shown, and which are sufficiently strong to support the necessary fans, wings, &c. At a point where said frame will balance a hollow circular socket or journal-box, $b$, is placed, being securely fastened between the bars $a\ a'$, and arranged to receive a corresponding hollow circular journal, $c$, the latter being rigidly fixed in a table, $d$, of any suitable material, which is secured at the top of the upright frame-work designed to support the frame A, and which forms a turn-table for said frame A. At a proper distance above the frame A, a hollow shaft, B, is sustained in position by the supports $e\ e'$, being arranged to revolve freely. To one end of this shaft the frame $f$, to which the fans or sails C C are attached, is securely fastened, the other end resting in its socket in $e$, the shoulders $g\ g'$ preventing it from being forced out of place. To the hollow shaft B at a point where it comes immediately over the hollow circular socket $b$, an eccentric-wheel, $h$, is rigidly attached. This eccentric-wheel is substantially made of any suitable material, and a groove is cut in its exterior side or periphery to receive the band $i$ that passes around it. The said band $i$ may be made of metal and forms the upper part of the shaft D that passes down through the hollow sockets $b$ and $c$ at right angles to the frame A, and being constructed so as to permit the eccentric-wheel $h$ to revolve within it, is the means of communicating the power to the machinery below. The frame $f$, which, as aforesaid, is securely fastened to one end of the shaft B, and which has attached to it the fans C C, is constructed with four or more arms that extend outward corresponding in length to the fans C C. The fans C C are of the usual form, and are arranged in series that are fastened together at their base, so as to permit of their being turned to catch the wind. Each series of fans is attached to turn upon one of the arms of the frame $f$, there being an arm for each series. At the rear end of the frame A, pivoted to turn between the bars $a\ a'$, is the rudder-wheel E, constructed of any suitable shape, to the lower part of which is pivoted an arm, $k$, that is connected with a rod or shaft, F. The rod F is made of some suitable metal of such size as to allow it to pass and move freely through the hollow shaft B. The end of said shaft or rod F, adjacent to the rudder-wheel E, is bent at an angle to the shaft B, and with this end the arm $k$ is connected in a joint. The other end of the rod F passes through the hollow-shaft B beyond the frame $f$, and through a circular guide-wheel, G, which is placed immediately in front of the frame $f$, its periphery being adjacent to the lower portion of the fans C C. The wheel G is so constructed as to turn readily, and is designed to act as a guide-wheel, as hereinafter described. To the wheel G arms $m\ m$ are jointed or otherwise attached so as to turn, (one arm being provided for each series of fans,) which arms extend to and are jointed to the lower part of each series of fans, substantially as shown; the means of attachment depending in a great measure upon the material used in the construction of the different parts. Pins $n\ n$ are rigidly attached to the periphery of the rudder-wheel E, and a bar, $p$, fastened at the extreme rear end of the frame A by means of which the turning of the wheel E and operation of the rod F are controlled. For a similar purpose a shoulder, $r$, may be constructed at that end of the rod F which passes beyond the frame $f$. Fans (67.)
THOMAS DAMON.
Improvement in Apparatus for Transmitting and Applying Power.
No. 121,854.  Patented Dec. 12, 1871.
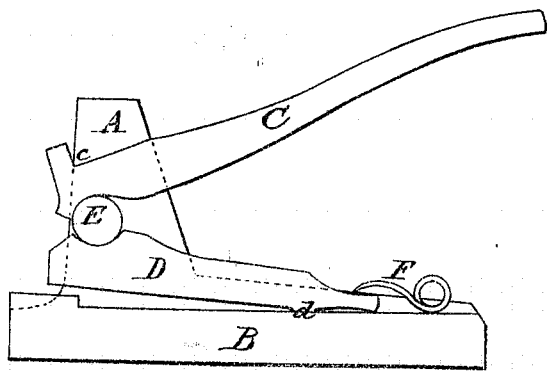
Fig. 2. Fig. 1.
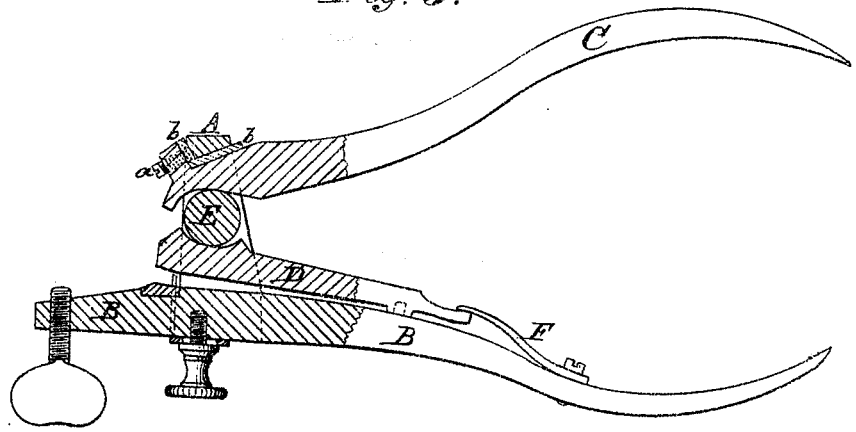
Fig. 3.
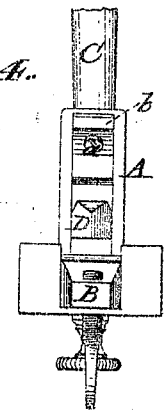
Fig. 4.
Witnesses:
J. C. Brecht.
Inventor
Thomas Damon
By his Attorney
Chas. F. Stansbury